April 23, 1929.   C. E. EVERARD   1,709,937
JEWELER'S IMITATION GEM DISPLAY BOOK
Filed May 9, 1927   2 Sheets-Sheet 1
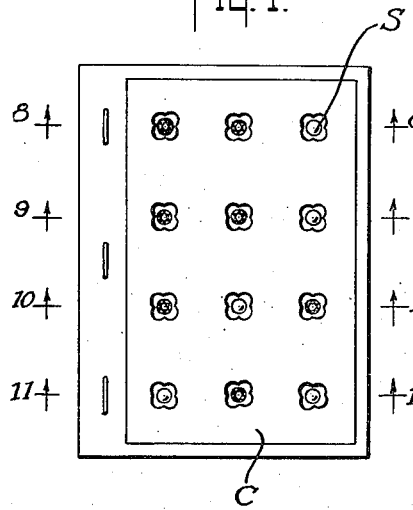
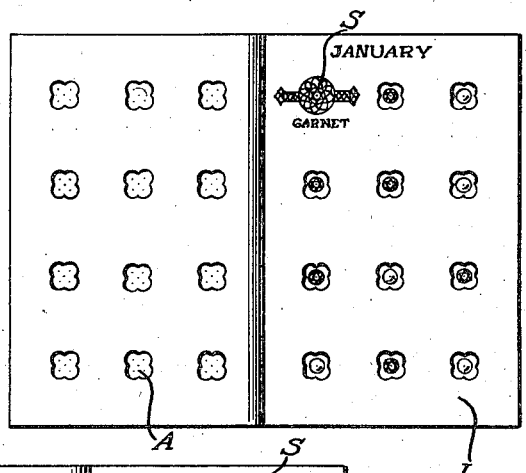
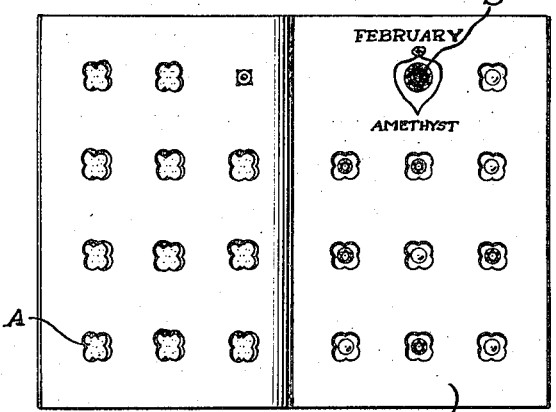
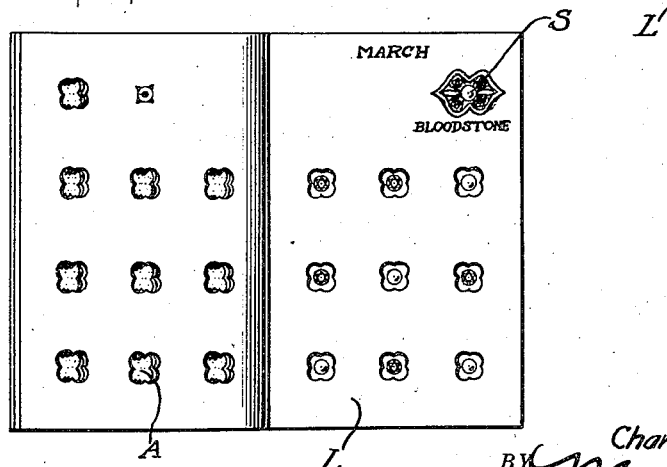
INVENTOR
Charles Edmund Everard;
BY Munn & Co.
ATTORNEY April 23, 1929.   C. E. EVERARD   1,709,937
JEWELER'S IMITATION GEM DISPLAY BOOK
Filed May 9, 1927   2 Sheets-Sheet 2
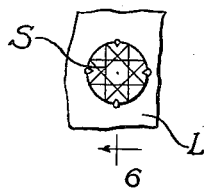
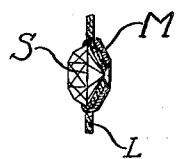
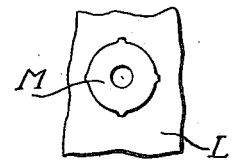
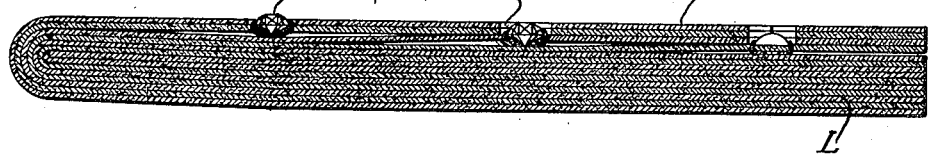
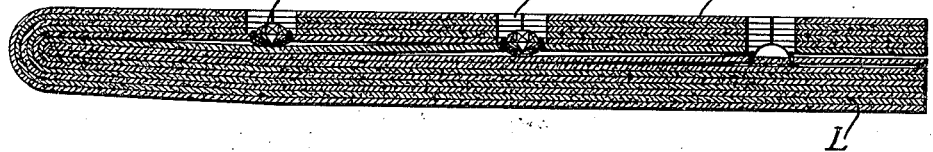
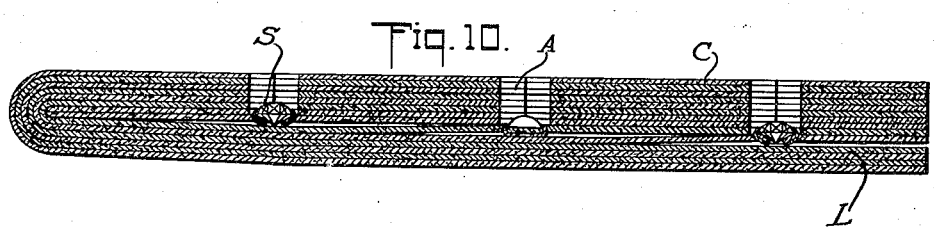
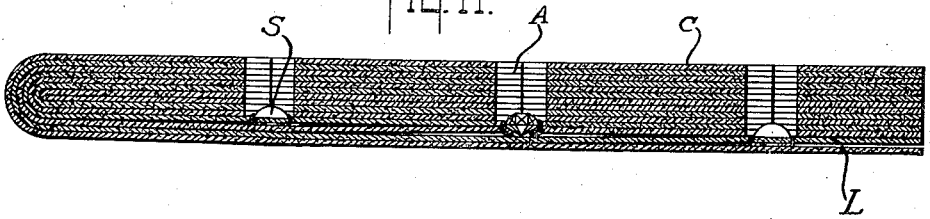
INVENTOR
Charles Edmund Everard;
BY Munn & Co.
ATTORNEY Patented Apr. 23, 1929.

1,709,937

UNITED STATES PATENT OFFICE.

CHARLES EDMUND EVERARD, OF PASADENA, CALIFORNIA.

JEWELER'S IMITATION-GEM-DISPLAY BOOK.

Application filed May 9, 1927. Serial No. 189,934.

My invention relates to and has for its purpose the provision of a jeweler's advertising novelty for the instructive and ornamental display of inexpensive but effective stones in imitation of precious and semi-precious stones, my invention being in the form of a book or pamphlet, the leaves of which are provided with the imitation stones and apertures so correlated that as each leaf is displayed from the topmost leaf downward the stones of all of the leaves therebeneath as well as the stone or stones attached to the leaf displayed will be exposed to view. My invention in its present embodiment comprises a book including twelve leaves each provided with a stone in imitation of one of the birthstones for the twelve calendar months, a pictorial representation of a piece of jewelry to provide an attractive setting for each stone and a legend suitable to each stone imprinted on each leaf. The book also includes a cover leaf, which together with the other twelve leaves is formed with apertures through which the stones on all of the leaves are exposed to view when the book is closed, thus producing a highly ornamental and artistic advertising novelty.

I will describe only one form of jeweler's imitation gem display book embodying my invention, and will then point out the novel features thereof in claims.

In the accompanying drawings;

Figure 1 is a view showing in closed position one form of display book embodying my invention;

Figures 2, 3 and 4 are views showing the book in open position and displaying different leaves thereof;

Figure 5 is a fragmentary view showing in front elevation one of the stones and its mounting in attached position to the leaf;

Figure 6 is a vertical sectional view taken on the line 6—6 of Figure 5;

Figure 7 is a view similar to Figure 5 showing the reverse side of the mounting;

Figures 8, 9, 10 and 11 are sectional views taken on the lines 8—8, 9—9, 10—10 and 11—11 of Figure 1 respectively.

Similar reference characters refer to similar parts in each of the several views.

Referring specifically to the drawings, my invention, in its present embodiment, comprises a book or pamphlet, the leaves of which may be of paper or any other suitable material to permit the permanent attaching of stones in imitation of precious or semi-precious stones to each leaf. In the present instance the leaves are constructed of paper and there are twelve such leaves L not including a cover leaf C. Attached to each leaf L is a stone S, in imitation of a precious or semi-precious stone, a conventional form of mounting M being provided for the purpose and its mode of application clearly illustrated in Figures 5, 6 and 7. With this mounting the stone is permently attached to the leaf so as to be displayed at the upper side of the leaf.

As illustrated in Figures 2, 3, and 4, the pictorial representation of a piece of jewelry is imprinted or otherwise affixed to the upper surface of the corresponding leaf to provide a setting for the stone and thus illustrate the attractiveness of the stone when set. Suitable descriptive matter of the particular stone may be printed on each leaf.

As previously described there are twelve leaves L, and the stones attached thereto are in imitation of the birthstone of the twelve calendar months. The printed matter on each page may be headed by the respective month which the birthstone represents, and the matter may also include the name of the stone and a suitable legend, as illustrated in Figures 2, 3 and 4.

The twelve leaves L as well as the cover leaf C are formed with apertures A for the purpose of exposing to view all of the stones on the leaves beneath any particular leaf displayed, while the apertures of the cover leaf expose to view the stones on all of the leaves when the book is closed as illustrated in Figure 1.

To accomplish this result and in such manner that consecutive reference to the leaves L will display the birthstones in proper calendar order, the stone S for the uppermost leaf is positioned to form the first stone of the uppermost horizontal row. The other two stones of the uppermost row are attached to the next two leaves therebeneath as clearly illustrated in Figure 8, while the first two leaves are apertured as illustrated to expose to one viewing the uppermost leaves the stones of the second and third leaves. As illustrated in Figures 9, 10 and 11, the remaining leaves are aperturned and provided with stones in the same manner as described in the first three leaves, it, of course, being understood that the bottommost leaf L is not apertured. By this arrangement of stones and apertures, the leaves as consecutively referred to from the topmost leaf inwardly will successfully display on the surface of each leaf the corresponding birthstone while exposed to view through the apertures thereof are all the stones of the leaves therebeneath. As the apertures of the cover leaf L corresponding in position to the stones on all of the leaves it will be clear that when the book is closed as shown in Figure 1 the stone on all of the leaves will be exposed to view through the apertures.

Although I have herein shown and described only one form of jeweler's imitation gem display book embodying my invention, it is to be understood that various changes and modifications may be made herein without departing from the spirit of the invention and the spirit and scope of the appended claims.

I claim as my invention:

1. A jeweler's gem display book having a plurality of leaves provided with registering openings therethrough, with each succeeding leaf from the topmost leaf downward having one less opening than the leaf immediately above, and being adapted to have a stone secured thereto in the place of the omitted opening to be exposed to view from the topmost leaf through the openings in the leaves above when the leaves are in superposed relation, and as each leaf is turned from the topmost leaf downward, the stones on all the leaves therebeneath as well as the stone on the particular leaf displayed, will be exposed to view.

2. A jeweler's gem display book having a plurality of leaves, all the leaves except the lowermost leaf having registering openings therethrough, the number of which decrease by one on each succeeding leaf from the top leaf, and being adapted to have a stone secured thereto in the place of the omitted opening to be exposed to view from the topmost leaf through the openings in the leaves above when the leaves are in superposed relation, and as each leaf is turned from the topmost leaf downward. the stones on all the leaves therebeneath as well as the stone on the particular leaf displayed, will be exposed to view.

3. A jeweler's gem display book having leaves corresponding in number to the number of calendar months in a year and being provided with a cover leaf, the cover leaf and all said leaves except the lowermost leaf having registering openings, with the openings of the cover leaf corresponding in number to the number of calendar months in a year, and the openings in each succeeding leaf from the cover leaf downward decreasing in number by one from the number of openings in the leaf immediately above and being adapted to have a birthstone secured thereto in the place of the omitted opening to be exposed to view from the cover leaf through the openings in the leaves above when the cover leaf and leaves are in superposed relation, and as each leaf is turned from the cover leaf downward, the birthstones on all leaves beneath as well as the birthstone on the particular leaf displayed will be exposed to view.

4. A jeweler's gem display book having a plurality of leaves provided with registering openings therethrough, the openings in the leaves decreasing in number from the topmost leaf downward, and the succeeding leaves from the topmost leaf being adapted to have stones secured thereto in place of the omitted openings, to be exposed to view through the openings in the leaves above when the leaves are in superposed relation, and as each leaf is turned from the topmost leaf downward, the stones on all the leaves therebeneath as well as on the leaves being displayed, will be exposed to view.

CHARLES EDMUND EVERARD.